Jan. 2, 1962  R. LEHMAN  3,015,324
CONVERSION INTERNAL COMBUSTION ENGINE FOR
USE AS A MARINE ENGINE

Filed Dec. 18, 1959  2 Sheets-Sheet 1

INVENTOR.
ROGER LEHMAN
BY
ATTORNEY

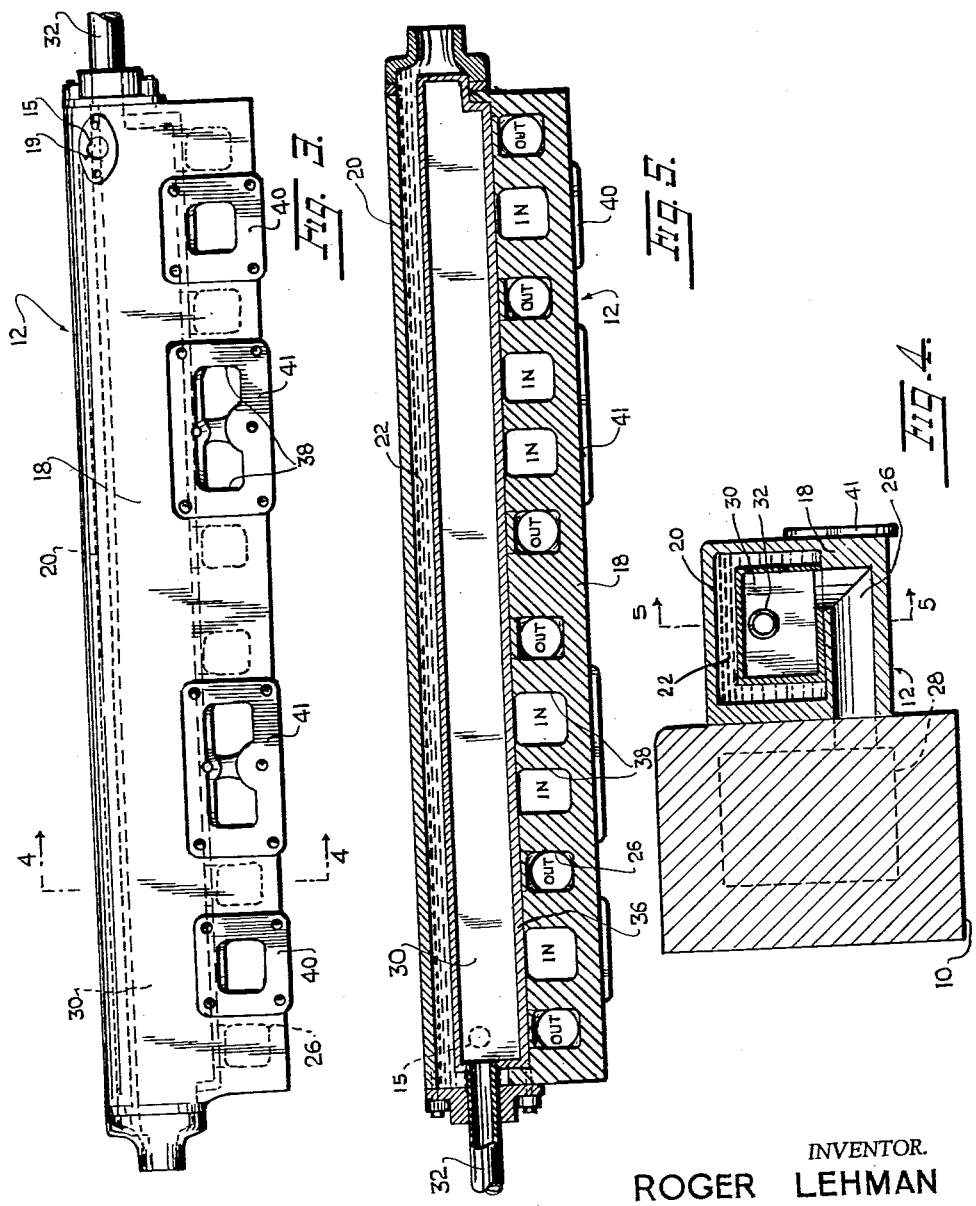

3,015,324
CONVERSION INTERNAL COMBUSTION ENGINE
FOR USE AS A MARINE ENGINE
Roger Lehman, 234 Raymond Ave., South Orange, N.J.
Filed Dec. 18, 1959, Ser. No. 860,547
3 Claims. (Cl. 123—122)

This invention relates to internal combustion engines and more particularly concerns a manifold structure especially adapted for converting diesel and gasoline internal combustion engines for marine and other uses.

A particular need for converting engines of the type mentioned is for an air intake and exhaust gas passage structure adapted to communicate with an air intake manifold which is mounted on the engine in a manner so as to reduce the overall height of the engine and to improve efficiency and economy of operation of the engine.

The present invention has as a principal object the provision of an engine having an intake manifold mounted in a position below the top of the engine.

A further object is to provide an engine manifold adapter structure with an exhaust chamber having common walls with air intake passages so that air taken in through the intake passages of the structure is preheated by the heat of the walls to improve efficiency and economy of operation of the engine.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 3 is an elevational view on an enlarged scale of an engine manifold structure according to the invention.

FIG. 4 is a sectional view taken on line 4—4 of FIG. 3.

FIG. 5 is a further sectional view taken on line 5—5 of FIG. 4.

Figure 1:
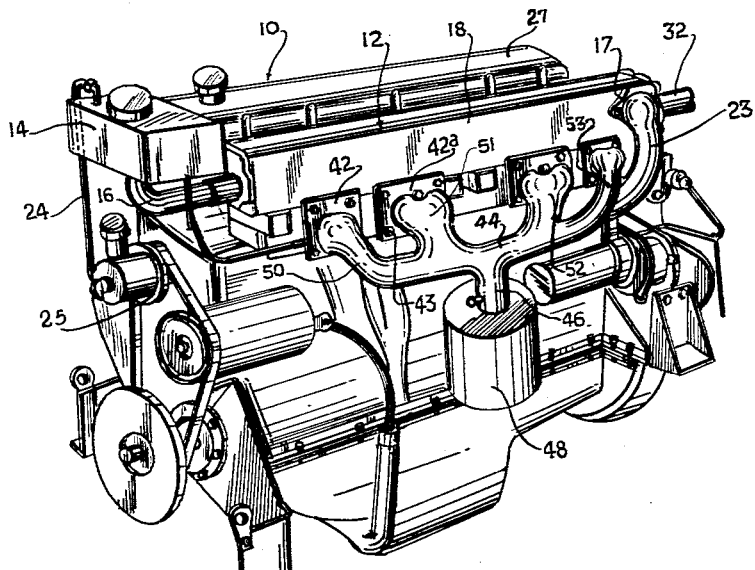
FIG. 1 is a perspective view of a portion of an engine embodying the invention.

Referring to FIG. 1 of the drawing there is shown an engine 10 of the internal combustion type having mounted thereon a manifold adapter structure 12 according to the invention. This structure includes a manifold housing 18. The housing is an elongated member having a long chamber 20 therein for circulating fresh water 22 therethrough as best shown in FIGS. 4 and 5. The water is supplied from a tank 14 mounted on the engine and connected to an inlet of the chamber 20 via a pipe 16. The housing 18 has an apertured seat 19 to which is bolted flanged end 17 of a water outlet pipe 23 communicating with opening 15 in the wall of chamber 20. Pipe 23 is in communication with a heat exchanger and water return pipe (not shown) via a pump 25. The engine water jackets 27 are connected between the pump 25 and the tank 14 to complete the water circulation path. An overflow tube 24 is connected to the top of tank 14 to provide for expansion of water when temperature rises.

Formed in the housing 18 are a plurality of exhaust gas passages 26 connected between cylinders 28 in the engine and an exhaust manifold 30 inside chamber 20. The exhaust manifold is cooled by the circulating water in chamber 20. The manifold 30 terminates in an exhaust pipe 32 connected to housing 18. Passages 26 conduct hot exhaust gases from the cylinders of the engine to the manifold chamber 30.

Figure 2:
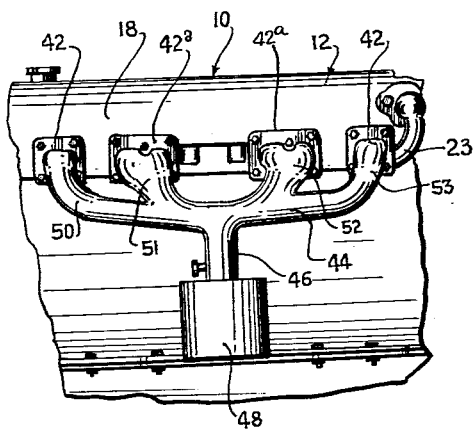
FIG. 2 is a fragmentary side elevational view of the engine, parts being omitted.

Passages 38 are air intake passages for supplying air to several cylinders of the engine. The passages 38 in the housing 18 have walls 36 common with the exhaust manifold 30. The air intake passages 38 open at the front of the housing 18 as best shown in FIG. 3. These passages have apertured flat flanged portions 40, 41 upon which may be secured by bolts 43 flanged ends 42, 42ᵃ of an intake manifold 44. The manifold has a common intake pipe section 46 to which is connected an air filter 48, best shown in FIG. 2.

It will be noted that the air intake manifold 44 is disposed so that the filter 48 is located well below the top of the engine. The positioning of the air intake manifold and consequent lowering of the air filter result in a lower overall height for the engine which is desirable in many installations such as in marine use and the like.

Due to the presence of the common walls 36 in the housing 18, between the exhaust chamber 30 and the air intake passages 38, the air taken in through passages 38 is preheated by the heat conducted through walls 36 from the hot exhaust gases in manifold 30 prior to their final cooling and discharge from the pipe 32. This preheating of the air before it enters the cylinders of the engine provides better operating efficiency and economy. The cooling of the exhaust gases reduces back pressure at the cylinders 28, increases their efficiency of operation and results in greater economy of operation of the engine. The invention is adapted for use with engines of any number of cylinders, such as four, six eight or more.

In the drawing the intake manifold 44 has four intake branch sections 50—53. The two inner sections 51, 52 are each connected to two intake passages 38. The manifold structure embodying the invention is shown applied to a six cylinder engine but it will be readily apparent that it may be applied to engines of other numbers of cylinders.

A particularly important feature of the invention is that the intake manifold structure 44 is of a known type, arranged in a novel manner. Thus, the invention is adapted for employing a conventional air intake manifold connected to a manifold housing 18 to which the invention is particularly directed. The housing 18 is connected to and mounted on a known type of engine. The invention may thus be regarded as concerning a waterjacketed exhaust manifold having provision to accommodate a standard intake manifold in a manner for improving the efficiency and economy of operation of an engine and for reducing its operational size.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A manifold structure for converting an internal combustion engine for use as a marine engine, said combustion engine having cylinders, said structure comprising a housing having a cooling chamber, an exhaust gas manifold in said chamber, means for circulating water in the chamber for cooling the exhaust gases, said housing having exhaust gas passages communicating directly with said exhaust manifold conducting exhaust gases thereto for cooling said exhaust gases, said housing having air intake passages for passing air therethrough to the cylinders of the engine, said housing having air inlets communicating with the air passages, said air intake passages and exhaust gas manifold having a common dividing wall, whereby the air in said air intake passages is preheated by conduction of heat from the common wall, said air intake passages terminating at the air inlets in said housing, an air intake manifold below the top of the engine having branches secured to the housing at the respective air inlets of the air intake passages, said air intake manifold having a depending common intake pipe, and an air filter secured to said intake pipe below the exhaust manifold.

2. A manifold structure for converting an internal combustion engine for use as a marine engine, said combustion engine having cylinders, said structure comprising a housing having a chamber for circulating water therethrough, an exhaust gas manifold in said chamber for cooling the exhaust gas by the circulating water, an exhaust pipe communicating with the exhaust gas manifold, said housing having exhaust gas passages communicating between the cylinders of said engine and said exhaust gas manifold, said housing having air intake passages, said air intake passages and exhaust gas manifold having common walls whereby air passing to the cylinders of the engine from the air intake passages is preheated.

3. A manifold structure for converting an internal combustion engine for use as a marine engine, said combustion engine having cylinders, said structure comprising a housing having a chamber for circulating water therethrough, an exhaust gas manifold in said chamber for cooling the exhaust gas by the circulating water, an exhaust pipe communicating with the exhaust gas manifold, said housing having exhaust gas passages communicating between cylinders of said engine and said exhaust gas manifold, said housing having air intake passages, said air intake passages and exhaust gas manifold having common walls whereby air passing to said cylinders from the air intake passages is preheated, an air intake manifold, below the top of the engine, said air intake manifold having a plurality of branch pipe sections with a common depending inlet pipe, said pipe sections connected to said air intake passages, and an air filter secured to the bottom of said common pipe.

References Cited in the file of this patent
UNITED STATES PATENTS

| | | |
|---|---|---|
| 1,151,503 | Wilesmith | Aug. 24, 1915 |
| 1,198,334 | Emerson | Sept. 12, 1916 |
| 1,412,266 | Berger | Apr. 11, 1922 |
| 1,973,889 | Timian | Sept. 18, 1934 |
| 2,001,669 | Smith | May 14, 1935 |
| 2,305,946 | Wilson | Dec. 22, 1942 |